March 22, 1938.  L. J. M. CAPEL  2,111,886
PARACHUTE
Filed May 12, 1936  3 Sheets-Sheet 1

INVENTOR:
LOUIS JEAN MOÏSE CAPEL
BY Haseltine, Lake & Co.
ATTORNEYS

March 22, 1938. L. J. M. CAPEL 2,111,886
PARACHUTE
Filed May 12, 1936 3 Sheets-Sheet 2

INVENTOR:
LOUIS JEAN MOÏSE CAPEL
BY Haseltine, Lake & Co.
ATTORNEYS

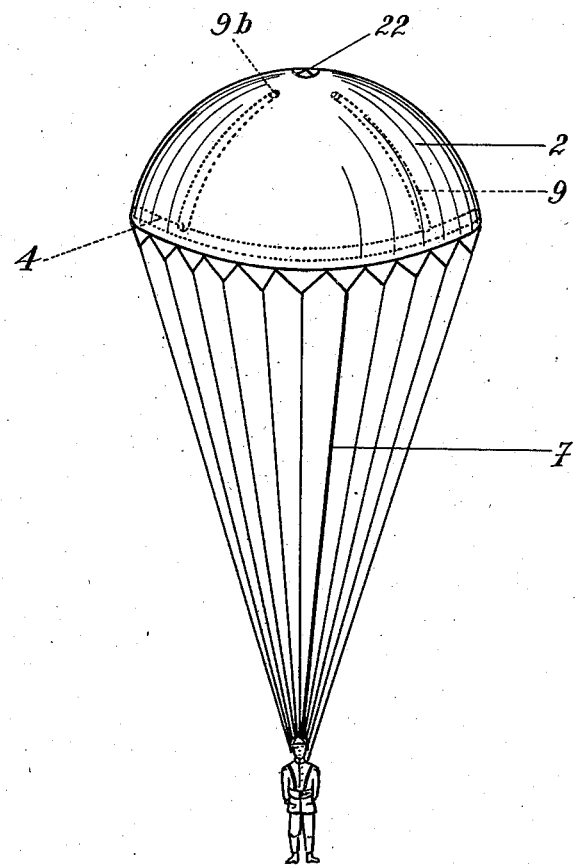

Patented Mar. 22, 1938

2,111,886

UNITED STATES PATENT OFFICE 2,111,886

PARACHUTE

Louis Jean Moïse Capel, Marseille, France

Application May 12, 1936, Serial No. 79,258
In France May 14, 1935

1 Claim. (Cl. 244—146)

Utilization of the rapid inflation of an air chamber disposed on the periphery of the surface of a parachute to bring about its immediate opening is well known. This arrangement obviously ensures maximum safety in the use of the parachute, thereby removing the very natural fear of the parachutist, who always wonders with anxiety at the moment of the descent whether it will open.

However, although the surface unfolds rapidly over its entire circumference owing to the application of the circular air chamber, this is not so with the part forming the dome of the parachute. In the first place, a certain period of time elapses before this part of the surface develops normally, and in the second place there is always the possibility of an irregular inflation at the start to be considered, this being due to various causes, such as hindrance by the folds of the fabric and irregular tension of one or more suspension lines, which constitutes a somewhat considerable defect which may sometimes be serious.

The object of the present invention resides particularly in obviating these dangers by the provision on the known sleeve of a plurality of sleeves joined perpendicularly thereto with the object of simultaneously and instantaneously effecting the opening of the parachute in both directions, that is to say, in the horizontal and vertical directions, the characteristic feature of the invention naturally residing in the perpendicularly disposed air sleeves.

The complete pneumatic device for effecting the opening of a parachute in accordance with the invention is illustrated in the accompanying drawings, which show by way of example one constructional form, and in which.

Figure 1:
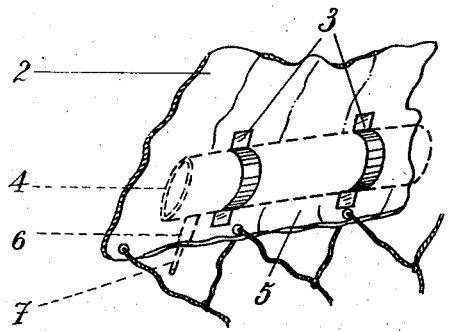
Figure 1 is a fragmentary sectional elevation of the edge of a parachute having the known circular air chamber, which is shown in broken lines in its deflated condition.
Figure 2:
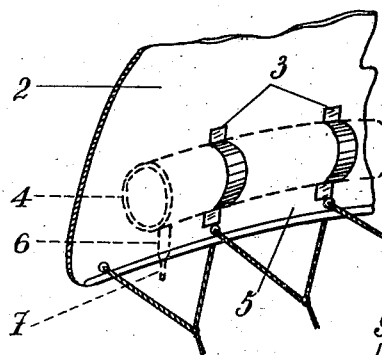
Figure 2 is a similar view showing the air chamber in its inflated condition.
Figure 3:
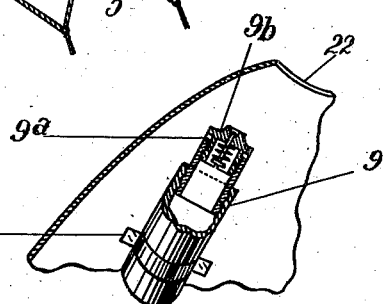
Figure 3:
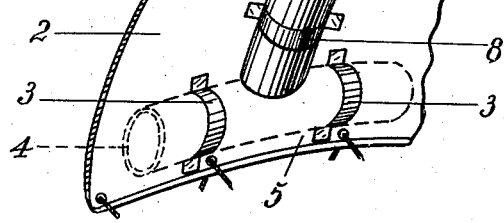
Figure 4:
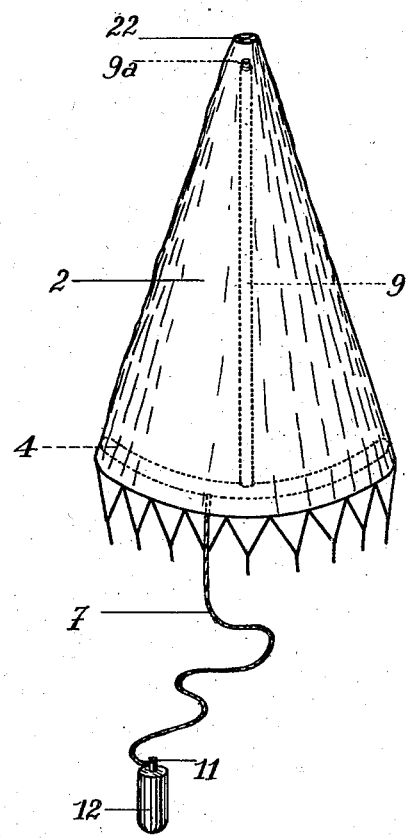
Figure 5:
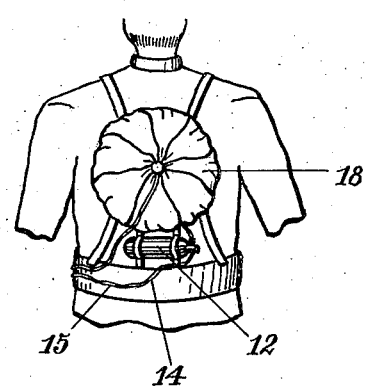
Figure 6:
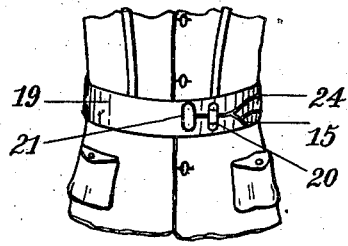
Figure 7:
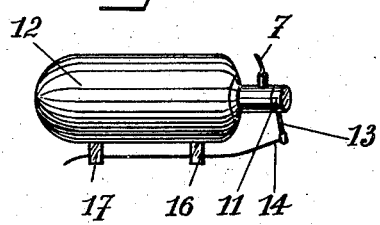

Figure 3 again shows the circular air chamber, to which there is joined perpendicularly thereto an air chamber provided with a safety valve;

Figure 4 shows, on a smaller scale, the unfolded parachute and the disposition of the longitudinal air chambers joined to the circular air chamber receiving the fluid which is to serve for their inflation;

Figures 5 and 6 show respectively the folded parachute and its compressed fluid reservoir for the inflation of the air chambers. The whole is placed in position on the back of the user, and the control grip arranged in front of the harness, which by its operation effects the opening of the bag and of the parachute;

Figure 7 shows, on a larger scale, the compressed fluid reservoir and the control of the cock thereof, and Figure 8 illustrates the parachute in use.

The device comprises a circular air chamber 4 of known arrangement and operation, to which are joined air chambers 9 which constitute the characteristic feature of the present invention. These air chambers 9, the number of which is not in any way limited, may have a diameter which is equal to, or different from, that of the air chamber 4 and are fixed to the surface 2 of the parachute by collars 8 or by any other known means. The chambers 9 are disposed in the manner of the ribs of an umbrella and function as such. Their upper parts, which extend close to the opening 22 at the apex of the parachute, are each provided with a safety valve 9a.

At any point in the circular air chamber 4 there is jointed a valve 6 by which it is possible, by means of a flexible tube 7, to connect the air chambers 9 to compressed air receptacles 11 and 12 (Figure 4). This receptacle (Figure 4), which is preferably of metal, is provided with a special cock 11 of which the lever arm 13 is associated with remote control through the intermediary of a flexible cable 14, 15 which is held and guided by supports 16 and 17 secured by suitable means, preferably to the flask, and then to the harness. The lever 13 may alternatively be operated by hand. The cock is also provided with a joint and, if desired, a valve 23, by which the filling of the flask 12 and the inflation of the air chambers 4 and 9, to which it is connected by the flexible tube 7, are controlled.

The number and dimensions of the different sleeves 4 and 9 may vary according to requirements and to the type of parachute to which the pneumatic opening device is to be applied. The same applies to their inter-connection and the method of securing which is used. However, all these modifications and alterations do not constitute any further improvement with respect to the present invention. When constructed in this way, the pneumatic device permitting of immediate and automatic opening of the parachute functions in the following manner:

The air sleeves being entirely deflated, the parachute is suitably folded in its bag 18 (Figure 5). It is then placed, as shown, on the back of the user (in the case of a back-type parachute), the compressed air flask 12 being preferably secured by the harness 19 under the bag 18, so that the flexible cable 14 and 15 may be wound round the harness 19 (to which it is secured by suitable means) and extend to the control grip 21 itself secured to the front of the said harness 19 as at 20.

The equipment is thus fully prepared and, whether the user acts voluntarily (by hand) or involuntarily (by the weight of his body falling in space), the following operation takes place in one or other of these two cases (which are usually the only ones provided for in present-day aviation):

The grip 21 being displaced from left to right, the flexible cable 24 acts as usual on the blade which, in all parachutes, cuts the cord holding the bag closed, and thereby releases the parachute. However, simultaneously and owing to the same displacement of the grip 21, the flexible cable 14, 15 brings into operation the control lever 13 actuating the special cock 11. Thus, the cock being opened, it immediately allows the compressed fluid in the flask 12 to penetrate through the flexible tube 7 and the valve 6 to the interior of the air chambers 4 and 9, completely inflating all of them together in a few seconds.

Due to the pressure of the air, the circular and longitudinal air chambers become rigid and immediately force the fabric of the parachute to unfold imparting to it the hemispherical form shown in Figure 8, so that the parachute is entirely opened.

The wind, however light, rushes under the fabric of the parachute, which is already in shape, the cords stretch owing to the weight of the user, and the entire form as shown is produced in a few seconds, thus permitting of a perfect landing irrespective of the distance through which the parachute has to travel, because this pneumatic opening device of a parachute, not requiring to travel any distance before operating (it may even open on land), utilizes the whole of the descent to damp the concussion and shock on landing. In this way, the numerous accidents, sometimes fatal, which occur when the parachute either does not open owing to bad folding or, what is more frequent, opens too late, whereby a part of the descent is taken up, which results in too sudden a landing owing to the fact that too short a distance remains for damping the speed of descent are alleviated.

It is to be taken into consideration that according to the altitude from which the parachute descends, the fluid may, owing to the pressure difference between it and the atmosphere, cause the air chambers or sleeves 4 and 9 to burst; for this reason, the safety valves 9ª (Figure 3) disposed at the free extremity of each of the air chambers or sleeves 9 allow the surplus air to escape and the preservation of the air chambers 4 and 9 is thus ensured.

After landing, the caps 9ᵇ of the valves will be unscrewed, as well as the joint 23 between the flexible tube 7 and the cock 11, and the air contained in the chambers 4 and 9 will escape and thus permit the parachute to be refolded. The caps 9ᵇ will be replaced in position and the joint 23 connected up to another receptacle 12 or on to the same receptacle previously filled with fluid under pressure, which is calculated to obtain an appropriate pressure in the air chambers so as to impart thereto the required rigidity.

In this way, extremely great progress is effected in the opening of parachutes by means of known pneumatic devices, giving a new result obtained by the application of longitudinal air chambers disposed in the surface in the manner of the ribs of an umbrella. The forms, dimensions and the materials employed in the construction of this pneumatic device may vary without departing from the spirit of the invention hereinbefore described.

What I claim and desire to secure by Letters Patent in the United States is:—

In a parachute the combination with an annular air chamber secured to the parachute near the lower edge thereof, of a plurality of longitudinal air chambers communicating with said annular air chamber and attached to the inner surface of the parachute, a pressure relief valve in each of said longitudinal air chambers, a container for air under pressure, means for supplying air from said container to said annular air chamber and thence to said longitudinal air chambers, a valve for controlling the flow of air from said container, a grip member for releasing the parachute and means whereby the operation of said grip member also actuates the valve for controlling the supply of air from the container to the annular air chamber.

LOUIS JEAN MOÏSE CAPEL.